(12) United States Patent
Pawar et al.

(10) Patent No.: US 10,271,340 B1
(45) Date of Patent: Apr. 23, 2019

(54) DYNAMIC OFFLOADING OF ONE OR MORE UES TO A DIFFERENT CARRIER IN RESPONSE TO A THRESHOLD HIGH NUMBER OF UES BEING SERVED WITH TTI BUNDLING

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 99 days.

(21) Appl. No.: 15/646,992

(22) Filed: Jul. 11, 2017

(51) Int. Cl.
*H04L 5/00* (2006.01)
*H04W 72/04* (2009.01)
*H04W 88/02* (2009.01)
*H04W 88/08* (2009.01)
*H04W 72/08* (2009.01)

(52) U.S. Cl.
CPC ......... *H04W 72/085* (2013.01); *H04L 5/0055* (2013.01); *H04W 72/044* (2013.01); *H04W 88/02* (2013.01); *H04W 88/08* (2013.01)

(58) Field of Classification Search
CPC . H04W 72/085; H04W 72/044; H04W 88/08; H04W 88/02; H04L 5/0055
See application file for complete search history.

(56) References Cited

U.S. PATENT DOCUMENTS

| | | | |
|---|---|---|---|
| 9,408,104 B1 | 8/2016 | Vivanco et al. | |
| 2009/0267581 A1* | 10/2009 | Nentwig | H02J 1/102 323/282 |
| 2013/0329701 A1* | 12/2013 | Bajzec | H04L 1/1887 370/336 |
| 2014/0334448 A1* | 11/2014 | Langereis | H04W 36/0072 370/331 |
| 2014/0369242 A1* | 12/2014 | Ng | H04W 72/0453 370/280 |

* cited by examiner

*Primary Examiner* — Mohammad S Anwar

(57) ABSTRACT

Methods and systems to help manage wireless communication with UEs in a manner that takes into account an extent of TTI bundling on a given carrier frequency. When a base station is serving a threshold high number of TTI-bundling-UEs on a first carrier frequency, the base station will reduce the number of TTI-bundling-UEs on the first carrier frequency by offloading one or more of the TTI-bundling-UEs from the first carrier frequency to a second carrier frequency. Further, to avoid increasing the number of TTI-bundling-UEs served on the first carrier frequency, when the base station detects a trigger event for enabling TTI bundling for an additional UE served on the first carrier frequency, the base station will offload the additional UE from the first carrier frequency to the second carrier frequency.

20 Claims, 4 Drawing Sheets

DYNAMIC OFFLOADING OF ONE OR MORE UES TO A DIFFERENT CARRIER IN RESPONSE TO A THRESHOLD HIGH NUMBER OF UES BEING SERVED WITH TTI BUNDLING

BACKGROUND

In some wireless communication systems, when data that is transmitted by a transmitting entity to a receiving entity is not received by the receiving entity, or is received by the receiving entity with one or more errors, the data may be re-transmitted by the transmitting entity. The re-transmission of data could occur either automatically or in response to feedback from the receiving entity. For example, in Long Term Evolution (LTE) air interfaces, a Hybrid Automatic Repeat Request (HARQ) procedure is used. In the HARQ approach, after a transmitting entity has transmitted a block of data, possibly together with error-correction coding, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data, possibly with different error-correction coding. Further, the transmitting entity may also re-transmit the data if the transmitting entity does not receive any HARQ response within a certain period of time.

This re-transmission approach can allow data to be successfully decoded by a receiving entity even when there is a substantial probability that the transmitted data would be received with one or more errors, for example, because of poor radio frequency (RF) conditions. Specifically, the data can be re-transmitted multiple times, possibly with varying error-correction coding, until the receiving entity can decode the data without errors. This re-transmission approach, however, also increases latency. For example, there can be a period of delay between when the transmitting entity transmits data and when the transmitting data receives a NACK response from the receiving entity, and there can be another period of delay between when the transmitting entity receives the NACK response and when the transmitting entity begins re-transmitting the data.

In order to reduce the delay associated with re-transmitting data, LTE supports a bundling option for data transmissions by the user equipment (UE) in the Physical Uplink Shared Channel (PUSCH). Normally, the UE transmits data in one transmission time interval (TTI), which corresponds to a 1 millisecond (ms) subframe, and then waits to receive a HARQ response before re-transmitting the data or transmitting additional data. However, when TTI bundling is used, the UE automatically transmits the data repeatedly in multiple consecutive TTIs and then waits to receive a HARQ response for that group of transmissions. In this way, the UE can transmit multiple instances of the data, which allows for more robust reception of the data, but without the delay that would be associated with the UE transmitting the data multiple times and waiting for a HARQ response after each transmission.

OVERVIEW

While TTI bundling can thus advantageously help minimize latency, a tradeoff for that benefit is that TTI bundling necessarily consumes air interface resources in multiple TTIs. Namely, when TTI bundling is enabled for a UE, the UE automatically transmits data in each of multiple TTIs. As a result, air interface resources need to be reserved for the UE's use in each of those TTIs, even if transmission in fewer TTIs might result in successful decoding of the data. If a low number of UEs are served with TTI bundling on a given carrier frequency, then this reservation of resources may not pose an issue. However, if a significantly high number of UEs are served with TTI bundling on the carrier frequency, then this reservation of resources could contribute to problems such as reduced throughput and blocking of other communications on that carrier frequency. Consequently, it could be useful to limit the extent of TTI bundling on a given carrier frequency.

One such technique for limiting the extent of TTI bundling on a given carrier frequency is to limit the number of UEs that are served with TTI bundling on that carrier frequency. Such UEs that are served with TTI bundling are referred to herein as "TTI-bundling-UEs." In order to provide such a limit on the number of TTI-bundling-UEs on a given carrier frequency, the base station could be configured to offload, from that carrier frequency to another carrier frequency, one or more of the TTI-bundling-UEs. For instance, the base station could detect that it serves a threshold high number of TTI-bundling-UEs on a first carrier frequency, and the base station could responsively offload one or more of the TTI-bundling-UEs from the first carrier frequency to a second carrier frequency. Further, the base station could continue to offload TTI-bundling-UEs from the first carrier frequency to the second carrier frequency until the number of TTI-bundling-UEs served on the first carrier frequency is at or below a threshold number.

In addition to offloading TTI-bundling-UEs from the first carrier frequency, the base station could further limit the extent of TTI bundling on the first carrier frequency by taking measures to avoid enabling TTI bundling for other UEs served on the first carrier frequency. In practice, the base station could be configured to enable TTI bundling for a UE upon detecting a trigger event, such as upon detecting that the UE is in poor RF coverage. However, in a scenario where the base station serves the threshold high number of TTI-bundling-UEs on the first carrier frequency and the base station detects such a trigger event for enabling TTI bundling for an additional UE operating on the first carrier frequency, the base station could responsively offload the additional UE from the first carrier frequency to the second carrier frequency in order to avoid adding to the number of TTI-bundling-UEs served on the first carrier frequency.

Further, the frequency of a carrier on which a UE is served may have an impact on the quality of the UE's service. For instance, lower carrier frequencies may facilitate higher channel quality and decreased packet loss during communication by providing improved RF propagation or the like. In contrast, higher carrier frequencies may result in channel quality degradation and higher packet losses by providing reduced RF propagation or the like. Consequently, when a UE is offloaded from one carrier frequency to another carrier frequency, the service quality experienced by the offloaded UE could vary depending on whether the UE is offloaded to a higher carrier frequency or a lower carrier frequency.

As noted above, one example trigger event for enabling TTI bundling for a UE could be that the UE is in poor RF conditions, and so at least some of the TTI-bundling-UEs served on the first carrier frequency could be served with TTI bundling as a result of experiencing poor RF conditions. Consequently, it could be undesirable to offload those TTI-bundling-UEs from the first carrier frequency to a higher carrier frequency, as this could further worsen the RF conditions of the offloaded UEs. Rather, in the above scenarios where the base station is serving a threshold high number of TTI-bundling-UEs on the first carrier frequency, the base station could choose a second carrier frequency based on the second carrier frequency having a lower frequency than the first carrier frequency. And the base station could offload one or more of the TTI-bundling-UEs from the first carrier frequency to the lower, second carrier frequency. The same considerations could apply in scenarios where the base station is offloading a UE from the first carrier frequency to the second carrier frequency responsive to detecting a trigger event for enabling TTI bundling for the UE. Not only would this allow for reducing the extent of TTI bundling on the first carrier frequency, but it could also improve the service quality for the offloaded UEs.

Accordingly, disclosed herein is a method for controlling TTI bundling in a wireless communication system that includes a base station serving a number of first UEs with TTI bundling on a first carrier frequency. In accordance with the method, the base station determines that the number of first UEs served with TTI bundling on the first carrier frequency exceeds a threshold number, where the threshold number is greater than zero, and the base station further detects a trigger event to begin TTI bundling service for a second UE that the base station currently serves without TTI bundling on the first carrier frequency. Based on both the determining and the detecting, the base station transitions from serving the second UE on the first carrier frequency to serving the second UE on a second carrier frequency that is different from the first carrier frequency.

Additionally, disclosed herein is another method for controlling TTI bundling in a wireless communication system that includes a base station serving a number of UEs with TTI bundling on a first carrier frequency. In accordance with the method, the base station determines that the number of first UEs served with TTI bundling on the first carrier frequency exceeds a threshold number, where the threshold number is greater than zero. Responsive to the determining, the base station performs an offloading process that involves (i) selecting a second carrier frequency based on the second carrier frequency being a lower frequency than the first carrier frequency and (ii) offloading one or more of the UEs served with TTI bundling from the first carrier frequency to the second carrier frequency in order to reduce the number of the UEs served with TTI bundling on the first carrier frequency to at most the threshold number.

Further disclosed is a base station configured to control TTI bundling in accordance with one or both of the above methods.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example radio access protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
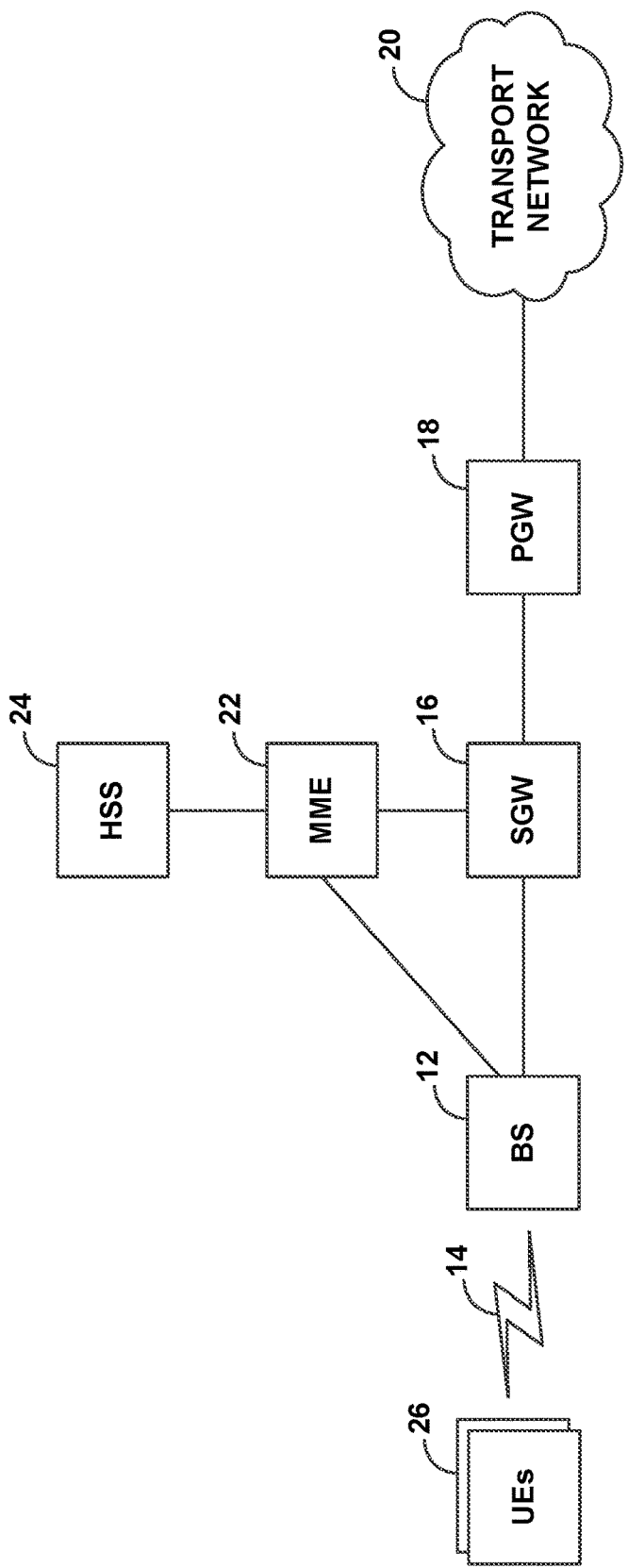
FIG. 1 is a simplified block diagram of a wireless communication system in which the present method and system can be implemented.

Referring to the drawings, as noted above, FIG. 1 is a simplified block diagram of a wireless communication system in which features of the present disclosure can be implemented. In particular, FIG. 1 depicts an example LTE network.

As shown, the example LTE network includes a representative LTE base station (evolved Node-B or "eNodeB") 12 (e.g., macro base station, small cell, relay, or other type of base station), configured to provide a wireless coverage area defining an air interface 14 for communicating with UEs. Base station 12 then has a communication interface with a serving gateway (SGW) 16, which in turn has a communication interface with a packet-data network gateway (PGW) 18, which provides connectivity with a transport network 20 such as the Internet. Further, base station 12 and SGW 16 have communication interfaces with a mobility management entity (MME) 22, which in turn has a communication interface with a home subscriber server (HSS) 24. These components of the LTE network could sit as nodes on a core packet-switched network operated by an LTE service provider, and the interfaces between the components could be virtual tunnels defined within that core network.

In a representative LTE network, the air interface 14 operates on a carrier, defining one or more ranges of frequency on which communications can flow in a downlink direction from the base station to UEs and in an uplink direction from UEs to the base station. For instance, the carrier could be frequency division duplex (FDD), with separate frequency ranges defined respectively for downlink use and uplink use, or time division duplex (TDD), with a single frequency range being time division multiplexed between downlink and uplink use.

On such a carrier, the LTE air interface is divided over time into a continuum of 10-millisecond frames, each of which is then divided into ten 1-millisecond subframes or TTIs, and each TTI is then divided over time into 14 symbol time segments of 66.7 microseconds. Further, the carrier has a frequency bandwidth (e.g., respectively for its downlink and uplink, if TDD), such as 1.4 MHz, 3 MHz, 5 MHz, 10 MHz, 15 MHz, or 20 MHz, which is divided into subcarriers of 15 kHz. As a result, in each TTI, the LTE air interface defines an array of "resource elements" each occupying a 15 kHz subcarrier and spanning 66.7 microseconds, and the subcarriers of these resource elements can be modulated to represent data for communication over the air interface between the base station and one or more UEs.

LTE then reserves certain ones of these resource elements for particular use.

For instance, on the downlink, the resource elements in the first one to three symbol time segments per subframe are generally reserved to define control channels, including a Physical Downlink Control Channel (PDSCH) and a Physical HARQ Channel (PHICH). And the resource elements in the remaining symbol time segments per subframe are generally reserved to define a Physical Downlink Shared Channel (PDSCH), with resource elements being grouped into physical resource blocks (PRBs) that the base station can allocate as needed to carry data from the base station to particular UEs. Further, certain downlink resource elements are reserved for other purposes. For instance, certain resource elements throughout the carrier bandwidth are reserved to carry a reference signal that UEs can measure as a basis to evaluate coverage quality.

And on the uplink, groups of resource elements at the low-frequency end of the carrier and at the high-frequency end of the carrier are generally reserved to define a Physical Uplink Control Channel (PUCCH). And the remaining resource elements per uplink subframe are generally reserved to define a Physical Uplink Shared Channel (PUSCH, as noted above), with resource elements similarly being grouped into PRBs that the base station can allocate as needed to carry data from particular UEs to the base station.

FIG. 1 depicts multiple UEs 26 within coverage of the base station 12. Each of these UEs could take any of various forms (such as a mobile phone, a computer, a tracking device, an embedded wireless module, or other wirelessly equipped device, whether or not user operated), and could be positioned at various locations within coverage of the base station. Some UEs could be in good coverage, such as being close to the base station and without significant RF obstructions, and other UEs could be in poor coverage, such as being far from the base station and/or indoors or otherwise faced with RF obstructions.

When a UE initially enters into coverage of the LTE network, the UE could discover coverage of base station 12 and could then engage in a process to register for service. For instance, the UE could engage in random access signaling and Radio Resource Control (RRC) signaling with the base station to establish an RRC connection for the UE. Further, the UE could engage in an attach process, through which the MME 22 could authenticate the UE and coordinate setup of one or more bearer tunnels for carrying communications between the UE and the PGW 18 (and thus between the UE and the transport network 20).

In addition, as part of the attach process or separately, the base station could receive UE profile data, indicating service authorizations, capabilities, and other information regarding the UE. The UE could transmit some such data to the base station as a UE-capability report or the like. Further, the MME could obtain some such data from the HSS and could transmit the data to the base station. The base station could then store the received profile data in a UE context record associated with the UE's RRC connection, for reference while serving the UE.

Once a UE is attached with the network and served by the base station, the base station could then coordinate air interface communication with the UE as necessary.

Considering uplink communication, for instance, when the UE has data to transmit on transport network 20, the UE could send a scheduling request to the base station via the PUCCH. And in response, the base station could then select PRBs of an upcoming subframe to carry the requested communication and could transmit to the UE on the PDCCH of a subframe an advanced scheduling directive, such as a downlink control information (DCI) message, to cause the UE to engage in the transmission in the selected PRBs of the upcoming subframe. At the designated time, the UE could thus transmit the data to the base station in the designated PRBs.

Further, the base station and UE could apply a HARQ process as discussed above. Namely, when the base station has scheduled uplink communication from the UE to occur in a particular subframe, the base station could then determine if the base station successfully receives and decodes that transmission. And the base station could transmit a HARQ message to the UE in the PHICH of a subsequent subframe (e.g., four subframes later if the carrier is FDD, or the next downlink subframe that is at least four subframes later if the carrier is TDD). If the base station successfully receives and decodes the UE's transmission, then the base station could transmit an ACK to the UE, after which the UE may then proceed with transmission of other data to the base station. Whereas, if the base station does not successfully receive and/or decode the UE's transmission, then the base station could transmit a NACK to the UE, in response to which the UE could then engage in a re-transmission, possibly with different error correction coding, in a subsequent uplink subframe (again possibly depending on FDD or TDD configuration).

As further noted above, the base station and UE could also make use of TTI bundling to help improve the chances of the base station successfully receiving and decoding the UE's transmissions. With TTI bundling, the UE could automatically engage in repeat transmission of data in multiple subframes (TTIs), possibly with varying error correction coding per transmission, and the base station could then provide a HARQ message for the bundle of those transmissions. For instance, with a bundling size of four subframes, the UE could automatically transmit the data at issue in each of four consecutive subframes (four sequentially occurring uplink subframes if the carrier is TDD), with varying error correction coding per subframe, and the base station could then determine whether the base station successfully received and decoded the data at issue and could provide an ACK or NACK message accordingly in a subsequent downlink subframe.

To apply TTI bundling, the base station could provide a TTI-bundling directive together with the scheduling directive that the base station sends to the UE to schedule the uplink transmission. For instance, if the base station provides a DCI to the UE to schedule uplink communication by the UE, the base station could designate in the DCI which PRBs the UE is to use and could designate a TTI bundling size representing how many upcoming uplink subframes in a row the UE should engage in the uplink transmission on those PRBs, or the base station could otherwise specify that TTI bundling is to be applied and, if not implicit, could designate the bundling size defining how many times to engage in the transmission. Upon receipt of such a directive, the UE could then responsively engage in transmission accordingly, using resources in each of the multiple subframes. And after those multiple transmissions, the base station could then provide the UE with a HARQ message indicating whether or not the base station successfully received and decoded the data at issue, and processing could continue as noted above.

The base station could be configured to invoke the use of TTI bundling for a UE upon detecting a trigger event. In particular, the trigger event could be that the UE is in poor RF coverage, such that the base station applies TTI bundling for a UE in response to detecting that the UE is in poor RF coverage. For instance, the UE could regularly monitor the reference signal from the base station and, when the reference signal becomes threshold weak, could transmit to the base station a measurement report indicating the threshold weak reference signal, as reference signal receive power (RSRP), reference signal receive quality (RSRQ) (a signal to noise ratio), or the like. Upon receiving such a measurement report from the UE, the base station could then set itself to apply TTI bundling for the UE, such as by setting a flag in the UE's context record for instance. Thus, when the base station then schedules uplink communication from the UE, the base station could responsively apply TTI bundling as described above. Further, other channel quality metrics could be considered as well.

In addition, the base station could take into account other factors as a basis to trigger TTI bundling for a UE. For instance, the base station could consider quality-of-service (QoS) attributes of one or more bearers established for the UE and could treat certain QoS levels as more heavily or lightly justifying application of TTI bundling. By way of example, if the UE has an established voice-over-IP bearer, designated by a high-level QoS attribute, the base station could more readily trigger TTI bundling for the UE, to help ensure quality voice communication. Further, the base station could consider the rate of a UE's HARQ re-transmissions and could more readily trigger TTI bundling for the UE if the UE's re-transmission rate has been threshold high. Other examples are possible as well.

As noted above, uplink communication with TTI bundling on a carrier frequency could consume more of the carrier frequency's air interface resources than uplink communication without TTI bundling. Consequently, as indicated above, it could be beneficial for a base station to reduce the extent of TTI bundling on a given carrier frequency. Namely, in a scenario where the base station serves a threshold high number of TTI-bundling-UEs on a first carrier frequency, it could be useful to offload one or more of the TTI-bundling-UEs from the first carrier frequency to a different, second carrier frequency. Additionally or alternatively, in such a scenario, it could be beneficial for the base station to strictly limit any further application of TTI bundling on the first carrier frequency. Namely, upon detecting a trigger event for invoking TTI bundling for a UE served on the first carrier frequency, the base station could offload the UE from the first carrier frequency to the second carrier frequency. In this way, the base station does not add to the number of TTI-bundling-UEs served on the first carrier frequency.

To carry this out in practice, base station 12 could regularly monitor the number of TTI-bundling-UEs served on the carrier frequencies of its air interface 14. In order to measure the number of TTI-bundling-UEs served on a carrier frequency, the base station could measure how many of the UEs on the carrier frequency are enabled to engage in TTI bundling. In particular, for each UE served on the carrier frequency, the base station could refer to the UE's context record and determine whether or not the UE is enabled to engage in TTI bundling based on whether or not the context record includes a flag indicating that the UE is enabled to engage in TTI bundling.

In another example, the base station could measure the number of TTI-bundling-UEs served on the carrier frequency by measuring how many of the UEs on the carrier frequency are actively engaged in TTI bundling. For instance, the base station could refer to its scheduling records to determine how many UEs are scheduled to engage, or have engaged, in TTI-bundled communication during a predefined time period. Such a predefined time period could include past, present, and/or future times.

In practice, the base station could then further regularly monitor to determine whether the number of TTI-bundling-UEs served on a carrier frequency is threshold high, representing a constraint that could justify reducing and/or limiting the number of TTI-bundling-UEs served on the carrier frequency. For this purpose, the base station could be provisioned with data indicating a predefined threshold number of TTI-bundling-UEs deemed to be sufficiently high, and the base station could compare the present number of TTI-bundling-UEs with that threshold to determine whether the number of TTI-bundling-UEs served on the carrier frequency is threshold high.

In some examples, the base station could be configured to dynamically define the threshold number of TTI-bundling-UEs deemed to be sufficiently high to justify reducing and/or limiting the number of TTI-bundling-UEs served on a carrier frequency. For instance, the base station could define the threshold number of TTI-bundling-UEs based on the TTI bundling sizes designated for each of the TTI-bundling-UEs. As noted above, each of the TTI-bundling-UEs could have a TTI bundling size defining how many uplink subframes are included in each TTI-bundled communication, such that TTI-bundling-UEs having a larger TTI bundling size could use more air interface resources than TTI-bundling-UEs having a smaller TTI bundling size. Consequently, it could be desirable to more aggressively limit the number of TTI-bundling-UEs served on a carrier frequency when the TTI-bundling-UEs have a larger TTI bundling size.

To carry this out in practice, the base station could refer to the context records for each TTI-bundling-UE served on the carrier frequency in order to determine each TTI-bundling-UE's respective TTI bundling size. The base station could then dynamically define the threshold number of TTI-bundling-UEs based on the respective TTI bundling factors of the TTI-bundling-UEs. For instance, the base station could determine an average TTI bundling factor for the TTI-bundling-UEs served on the carrier frequency and define the threshold number of TTI-bundling-UEs based on the determined average TTI bundling factor. By way of example, the base station could define the threshold number of TTI-bundling-UEs to be inversely proportional to the determined average TTI bundling factor, such that a higher average TTI bundling factor results in a lower threshold number of TTI-bundling-UEs, and vice versa. Other examples are possible as well.

In any case, once the base station determines that the number of TTI-bundling-UEs served on a carrier frequency is threshold high, the base station could then responsively set itself to reduce and/or limit the number of TTI-bundling-UEs served on the carrier frequency.

In order to reduce the number of TTI-bundling-UEs served on a given, first carrier frequency, the base station could offload one or more of the TTI-bundling-UEs from the first carrier frequency to a different, second carrier frequency. For instance, the base station could transmit to the one or more TTI-bundling-UEs a directive, such as an RRC connection reconfiguration message, that causes the one or more TTI-bundling-UEs to tune to and operate on the second carrier frequency, thereby reducing the number of TTI-bundling-UEs served on the first carrier frequency.

In practice, the number of offloaded TTI-bundling-UEs could depend on the extent that the number of TTI-bundling-UEs served on the first carrier frequency exceeds the threshold number of TTI-bundling-UEs. For instance, the base station could be configured to offload TTI-bundling-UEs from the first carrier frequency to the second carrier frequency until the number of TTI-bundling-UEs served on the first carrier frequency is equal to or less than the threshold number of TTI-bundling-UEs.

Additionally, in order to limit any further application of TTI bundling on the first carrier frequency, the base station could offload a UE from the first carrier frequency to the second carrier frequency when faced with a trigger that would normally justify application of TTI bundling for the UE. For instance, in a scenario where the number of TTI-bundling-UEs served on the first carrier frequency is threshold high and where TTI bundling gets triggered for a UE served on the first carrier frequency when the UE has threshold poor channel quality, such as threshold low RSRP or RSRQ, the base station could transmit to the UE a directive that causes the UE to tune to and operate on the second carrier frequency, thereby avoiding an increase to the number of TTI-bundling-UEs served on the first carrier frequency.

As further noted above, when offloading UEs from the first carrier frequency, it could be desirable to offload the UEs to a carrier frequency that is a lower frequency, and thus has better RF propagation, than the first carrier frequency in order to improve the RF conditions of the offloaded UEs. In practice, the base station could operate on a set of carrier frequencies ranging from a lowest carrier frequency to a highest carrier frequency. As such, when offloading UEs from the first carrier frequency to the second carrier frequency, the base station could select from the set of carrier frequencies a particular carrier frequency as the second carrier frequency on which to serve the offloaded UEs. And when selecting the particular carrier frequency on which to serve the offloaded UEs, the base station could select one carrier frequency instead of another based on the selected carrier frequency being a lower frequency than the unselected carrier frequency.

In some scenarios, by way of example, responsive to determining that the number of TTI-bundling-UEs served on the first carrier frequency is threshold high, the base station could select a second carrier frequency based on the second carrier frequency being lower than the first carrier frequency and offload one or more of the TTI-bundling-UEs from the first carrier frequency to the lower, second carrier frequency. In other scenarios, responsive to determining that the number of TTI-bundling-UEs served on the first carrier frequency is threshold high and responsive to detecting a trigger event for invoking TTI bundling service for an additional UE served on the first carrier frequency, the base station could select a second carrier frequency based on the second carrier frequency being lower than the first carrier frequency and offload the additional UE from the first carrier frequency to the lower, second carrier frequency.

In the above examples, offloading the UEs to a lower carrier frequency could likely increase communication quality due to improved RF propagation on lower carrier frequencies. For instance, improved RF propagation may result in fewer lost or erroneous data packets sent between the offloaded UEs and the base station. Accordingly, offloading TTI-bundling-UEs and other UEs that qualify for TTI bundling from the first frequency to the lower, second frequency provides several benefits. First, the extent of TTI bundling on the first carrier frequency is reduced, thereby reducing air interface congestion on the first carrier frequency. Additionally, the offloaded UEs are served on a frequency that allows for better RF propagation, thereby improving the RF conditions of the offloaded UEs. This could be particularly beneficial to TTI-bundling-UEs and UEs that qualify for TTI bundling because, as noted above, such UEs are often experiencing poor RF conditions.

Further, while the above examples describe the first and second carrier frequencies as being provided by a single base station, in some examples, the first and second carrier frequencies could be provided by separate base stations. For instance, the first carrier frequency could be a carrier frequency provided by base station 12, and the second carrier frequency could be a carrier frequency provided by a neighboring base station, such that offloading a UE from the first carrier frequency to the second carrier frequency could involve base station 12 handing over the UE to be served by the neighboring base station.

In some scenarios, by way of example, responsive to determining that the number of TTI-bundling-UEs served on the first carrier frequency is threshold high, base station 12 could invoke a handover process to handover one or more of the TTI-bundling-UEs to a neighboring base station that operates on a different, second carrier frequency, thereby offloading the one or more TTI-bundling-UEs from the first carrier frequency of base station 12 to the second carrier frequency of the neighboring base station. In other scenarios, responsive to determining that the number of TTI-bundling-UEs served on the first carrier frequency is threshold high and responsive to detecting a trigger event for invoking TTI bundling service for an additional UE served on the first carrier frequency, base station 12 could invoke a handover process to handover the additional UE to the neighboring base station, thereby offloading the additional UE from the first carrier frequency of base station 12 to the second carrier frequency of the neighboring base station.

In practice, base station 12 could invoke handover of a UE in a number of ways. For instance, the UE could receive from the base station, or otherwise be provisioned with, one or more measurement events that define situations when the UE should transmit measurement reports to the base station to facilitate possible handover. LTE defines several such measurement events, including (i) Event A3, which is triggered when a neighboring cell becomes better than the serving cell by a defined threshold offset, (ii) Event A4, which is triggered when a neighboring cell becomes better than a defined threshold level, and (iii) Event A5, which is triggered when the serving cell becomes worse than a threshold and a neighboring cell becomes better than a threshold. The UE could thus regularly evaluate coverage strength (e.g., reference signal receive power (RSRP) and/or reference signal receive quality (RSRQ) or the like) from the base station as well as from the other neighboring base stations. And when the UE detects that a measurement event occurs, the UE could responsively transmit to the base station a measurement report informing the base station of the carrier frequencies and coverage strengths of the detected neighboring coverage areas to enable the base station to process handover of the UE if appropriate.

Thus, in order to invoke handover of the UE, the base station could refer to a recent measurement report and identify as a target base station, a neighboring base station that operates on a different carrier frequency and that has sufficiently strong coverage as detected by the UE. Alternatively, if the UE has not recently provided a measurement report to the base station, then the base station could instruct the UE to scan for nearby coverage and provide a measurement report from which the base station could identify a target neighboring base station.

Further, for reasons similar to those described above, it could be desirable for the base station to hand over the UE to be served by a neighboring base station on a carrier frequency that is a lower frequency than the UE's current carrier frequency. Thus, in some examples, when identifying the target neighboring base station, the base station could preferentially select a neighboring base station based on the neighboring base station operating on a carrier frequency that is a lower frequency than the carrier frequency on which the UE is currently served.

Upon identifying a target neighboring base station in a representative handover process, the base station could transmit to the identified target neighboring base station a handover request message, the target neighboring base station could reserve resources to facilitate serving the UE, and the base station could transmit to the UE a directive for the UE to transition from being served by the base station to being served by the target neighboring base station. In this manner, the base station offloads the UE from a first carrier frequency of the base station to a second carrier frequency of the neighboring base station.

Figure 2:
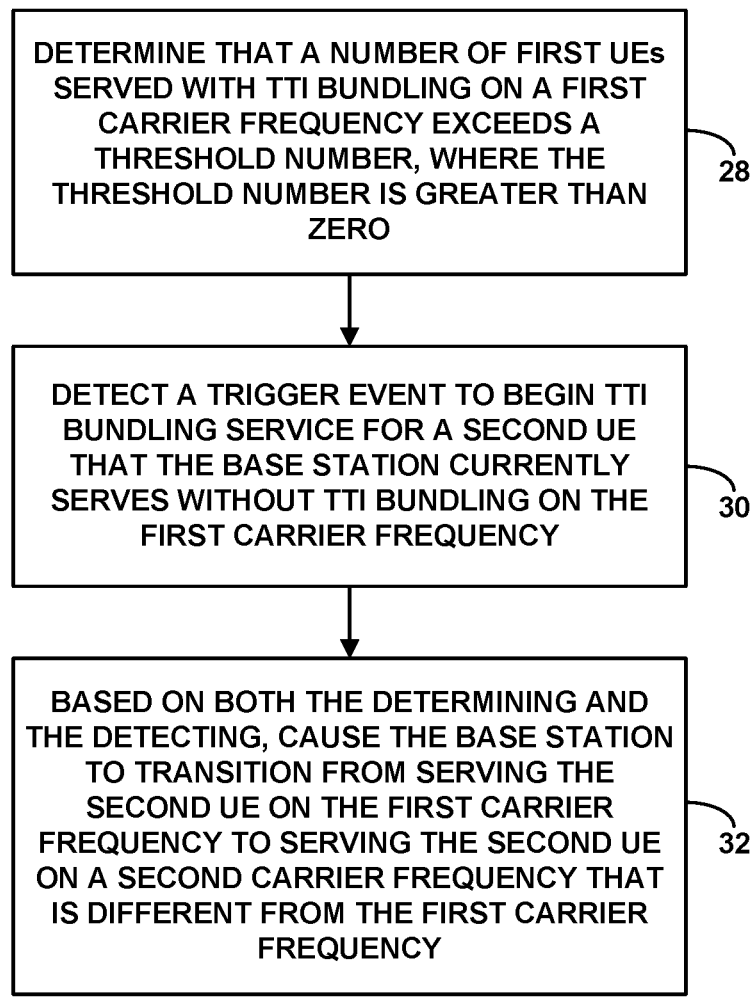
FIG. 2 is a flow chart depicting example operations in accordance with the disclosure.

FIG. 2 is next a flow chart depicting in summary various operations that can be carried out in accordance with the present disclosure, to control TTI bundling (e.g., uplink TTI bundling) in a wireless communication system. In line with the discussion above, the wireless communication system would include a base station serving a number of first UEs with TTI bundling on a first carrier frequency.

As shown in FIG. 2, at block 28, the base station determines that the number of first UEs served with TTI bundling on the first carrier frequency exceeds a threshold number that is greater than zero. And at block 30, the base station detects a trigger event to begin TTI bundling service for a second UE that the base station currently serves without TTI bundling on the first carrier frequency. As discussed above, for example, such a trigger event could be based on the second UE having air interface channel quality lower than a defined channel quality threshold, determined based on an evaluation of a reference signal from the base station for instance.

At block 32, based on the base station (i) determining that the number of first UEs served with TTI bundling on the first carrier frequency exceeds the threshold number and (ii) detecting the trigger event to begin TTI bundling service for the second UE, the base station causes itself to transition from serving the second UE on the first carrier frequency to serving the second UE on the second carrier frequency. As a result, the base station limits the extent of TTI bundling on the first carrier frequency by offloading the second UE from the first carrier frequency before invoking TTI bundling service for the second UE.

In line with the discussion above, when offloading the second UE from the first carrier frequency, it could be desirable to offload the second UE to a frequency that is lower than the first carrier frequency in order to improve the RF conditions of the second UE. As such, the act of transitioning from serving the second UE on the first carrier frequency to serving the second UE on the second carrier frequency could involve the base station selecting the second carrier frequency based on the second carrier frequency being a lower frequency than the first carrier frequency, and causing the base station to transition from serving the second UE on the first carrier frequency to serving the second UE on the lower, second carrier frequency.

Figure 3:
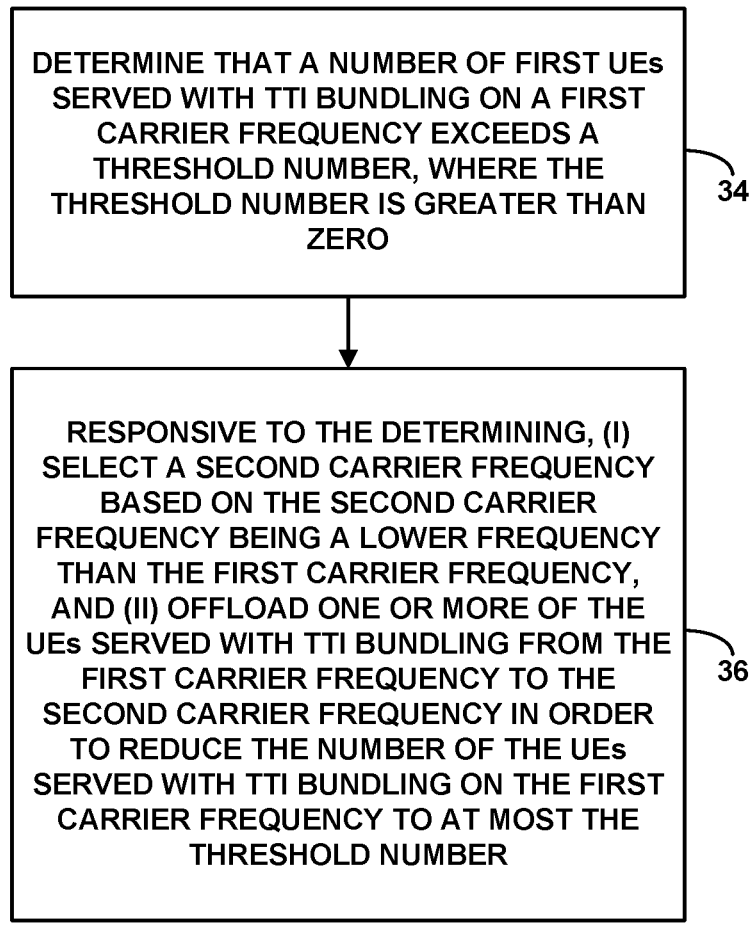
FIG. 3 is another flow chart depicting example operations in accordance with the disclosure.

FIG. 3 is next another flow chart depicting in summary various operations that can be carried out in accordance with the present disclosure, to control TTI bundling in a wireless communication system that includes a base station serving a number of first UEs with TTI bundling on a first carrier frequency. As shown in FIG. 3, at block 34, the base station determines that the number of first UEs served with TTI bundling on the first carrier frequency exceeds a threshold number that is greater than zero. And at block 36, responsive to determining that the number of first UEs served with TTI bundling on the first carrier frequency exceeds the threshold number, the base station performs an offloading process. The offloading process includes (i) selecting a second carrier frequency based on the second carrier frequency being a lower frequency than the first carrier frequency, and (ii) offloading one or more of the UEs served with TTI bundling from the first carrier frequency to the second carrier frequency in order to reduce the number of the UEs served with TTI bundling on the first carrier frequency to at most the threshold number.

Figure 4:
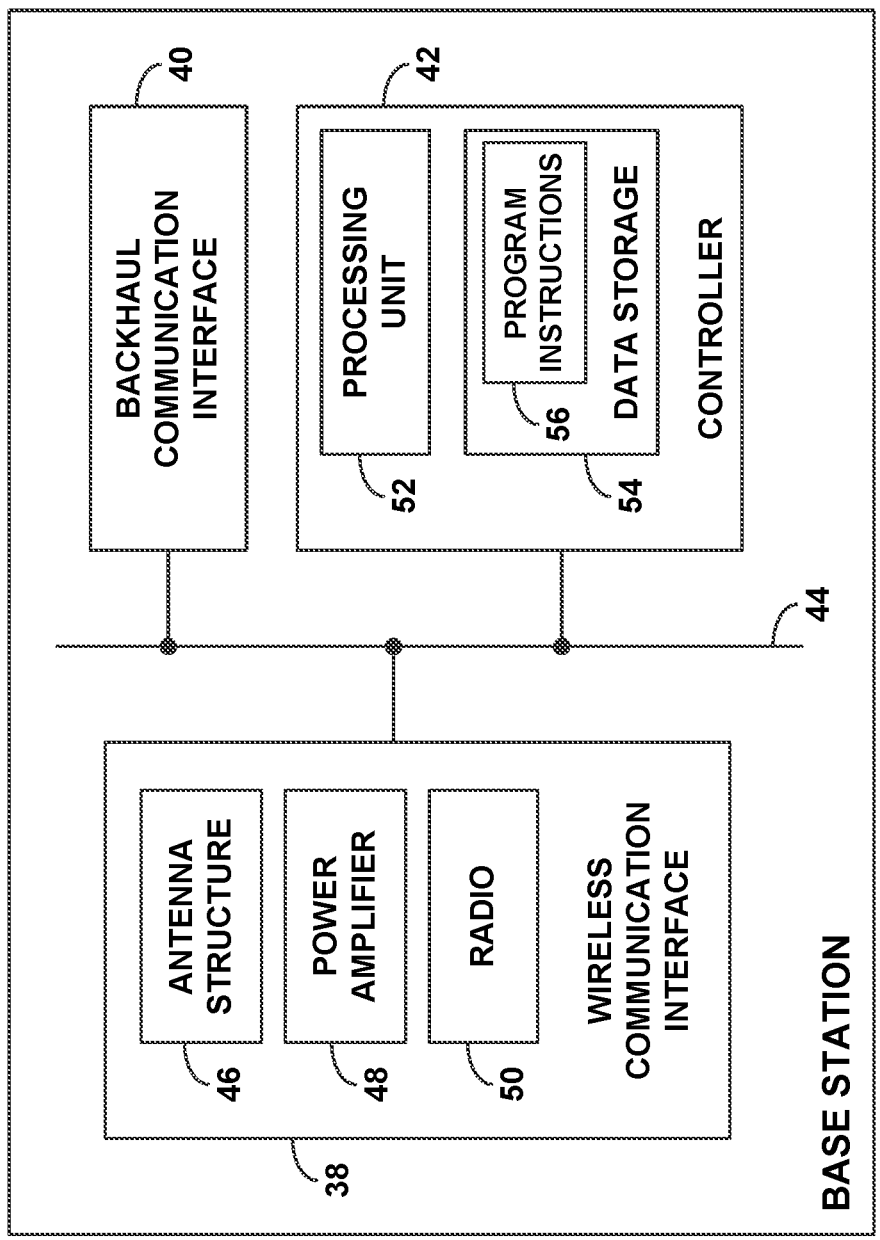
FIG. 4 is a simplified block diagram of an example base station operable in accordance with the disclosure.

Finally, FIG. 4 is a simplified block diagram of an example base station, showing some of the components that could be included in the base station to facilitate carrying out operations such as those described above. As shown, the example base station includes a wireless communication interface 38, a backhaul network interface 40, and a controller 42, all of which could be integrated together and/or communicatively linked together by a system bus, network, or other connection mechanism 44.

As shown, the wireless communication interface 38 includes an antenna structure 46 that is configured to transmit and receive on the air interface, as well as a power amplifier 48, and radio 50, cooperatively facilitating downlink and uplink communications. The backhaul network interface 40 then includes one or more network interface modules for coupling with a core network or the like. And the controller 42 includes a processing unit (e.g., one or more microprocessors) 52, non-transitory data storage (e.g. one or more volatile and/or non-volatile storage components such as magnetic, optical, or flash storage) 54, and program instructions 56 stored in the data storage and executable by the processing unit to carry out various base station operations such as those discussed above.

Exemplary embodiments have been described above. Those skilled in the art will understand, however, that changes and modifications may be made to these embodiments without departing from the true scope and spirit of the invention.

We claim:

1. A method for controlling Transmission Time Interval (TTI) bundling in a wireless communication system, wherein the wireless communication system comprises a base station serving a number of first user equipment devices (UEs) with TTI bundling on a first carrier frequency, the method comprising:

determining that the number of first UEs served with TTI bundling on the first carrier frequency exceeds a threshold number, wherein the threshold number is greater than zero;

detecting a trigger event to begin TTI bundling service for a second UE that the base station currently serves without TTI bundling on the first carrier frequency; and based on both the determining and the detecting, causing the base station to transition from serving the second UE on the first carrier frequency to serving the second UE on a second carrier frequency that is different from the first carrier frequency.

2. The method of claim 1, wherein the second carrier frequency is a lower frequency than the first carrier frequency, and wherein causing the base station to transition from serving the second UE on the first carrier frequency to serving the second UE on the second carrier frequency comprises:
- selecting the second carrier frequency based on the second carrier frequency being a lower frequency than the first carrier frequency, and
- causing the base station to transition from serving the second UE on the first carrier frequency to serving the second UE on the lower, second carrier frequency.

3. The method of claim 1, wherein causing the base station to transition from serving the second UE on the first carrier frequency to serving the second UE on the second carrier frequency comprises causing the base station to transmit to the second UE a directive that causes the second UE to tune to and operate on the second carrier frequency.

4. The method of claim 1, wherein determining that the number of first UEs served with TTI bundling on the first carrier frequency exceeds the threshold number comprises:
- accessing one or more records of the base station to determine how many of the base station's served UEs are enabled to engage in TTI bundled communication on the first carrier frequency, and
- based on how many of the base station's served UEs are enabled to engage in TTI bundled communication on the first carrier frequency, determining that the number of first UEs served with TTI bundling on the first carrier frequency exceeds the threshold number.

5. The method of claim 1, wherein determining that the number of first UEs served with TTI bundling on the first carrier frequency exceeds the threshold number comprises:
- accessing one or more records of the base station to determine how many of the base station's served UEs are actively engaged in TTI bundled communication on the first carrier frequency, and
- based on how many of the base station's served UEs are actively engaged in TTI bundled communication on the first carrier frequency, determining that the number of first UEs served with TTI bundling on the first carrier frequency exceeds the threshold number.

6. The method of claim 1, wherein each of the first UEs served with TTI bundling has a respective TTI bundling size defining a number of times a given transmission is repeated before an associated acknowledgement message is provided, and wherein the threshold number is dynamically defined based on the respective TTI bundling sizes of first UEs served with TTI bundling on the first carrier frequency.

7. The method of claim 6, wherein the threshold number is proportional to an average of TTI bundling sizes of the first UEs served with TTI bundling on the first carrier frequency.

8. The method of claim 6, further comprising using the respective TTI bundling sizes of the first UEs to determine the threshold number.

9. A method for controlling Transmission Time Interval (TTI) bundling in a wireless communication system, wherein the wireless communication system comprises a base station serving a number of user equipment devices (UEs) with TTI bundling on a first carrier frequency, the method comprising:
- determining that the number of UEs served with TTI bundling on the first carrier frequency exceeds a threshold number, wherein the threshold number is greater than zero; and
- responsive to the determining, performing an offloading process comprising:
  - (i) selecting a second carrier frequency based on the second carrier frequency being a lower frequency than the first carrier frequency; and
  - (ii) offloading one or more of the UEs served with TTI bundling from the first carrier frequency to the second carrier frequency in order to reduce the number of the UEs served with TTI bundling on the first carrier frequency to at most the threshold number.

10. The method of claim 9, wherein selecting the second carrier frequency based on the second carrier frequency being a lower frequency than the first carrier frequency comprises selecting a neighboring base station based on the neighboring base station operating on the lower second carrier frequency, and wherein offloading the one or more of the UEs served with TTI bundling from the first carrier frequency to the second carrier frequency comprises handing over the one or more UEs to be served on the second carrier frequency by the neighboring base station.

11. The method of claim 9, wherein determining that the number of UEs served with TTI bundling on the first carrier frequency exceeds the threshold number comprises:
- accessing one or more records of the base station to determine how many of the base station's served UEs are enabled to engage in TTI bundled communication on the first carrier frequency, and
- based on how many of the base station's served UEs are enabled to engage in TTI bundled communication on the first carrier frequency, determining that the number of UEs served with TTI bundling on the first carrier frequency exceeds the threshold number.

12. The method of claim 9, wherein determining that the number of UEs served with TTI bundling on the first carrier frequency exceeds the threshold number comprises:
- accessing one or more records of the base station to determine how many of the base station's served UEs are actively engaged in TTI bundled communication on the first carrier frequency, and
- based on how many of the base station's served UEs are actively engaged in TTI bundled communication on the first carrier frequency, determining that the number of UEs served with TTI bundling on the first carrier frequency exceeds the threshold number.

13. The method of claim 9, wherein each of the UEs served with TTI bundling has a respective TTI bundling size defining a number of times a given transmission is repeated before an associated acknowledgement message is provided, and wherein the threshold number is dynamically defined based on the respective TTI bundling sizes of the UEs served with TTI bundling on the first carrier frequency.

14. The method of claim 13, wherein the threshold number is proportional to an average of the TTI bundling sizes of the UEs served with TTI bundling on the first carrier frequency.

15. The method of claim 13, further comprising using the respective TTI bundling sizes of the UEs served with TTI bundling on the first carrier frequency to determine the threshold number.

16. A base station configured to control TTI bundling in a wireless communication system, wherein the base station is configured to serve a number of first user equipment devices (UEs) with TTI bundling on a first carrier frequency, the base station comprising:
- an antenna structure configured to transmit and receive on the air interface; and
- a controller configured to (i) determine that the number of first UEs served with TTI bundling on the first carrier frequency exceeds a threshold number, wherein the threshold number is greater than zero, (ii) detect a trigger event to begin TTI bundling service for a second UE that the base station currently serves without TTI bundling on the first carrier frequency, and (iii) based on both the determining and the detecting, cause the base station to transition from serving the second UE on the first carrier frequency to serving the second UE on a second carrier frequency that is different from the first carrier frequency.

17. The base station of claim 16, wherein the second carrier frequency is a lower frequency than the first carrier frequency, and wherein causing the base station to transition from serving the second UE on the first carrier frequency to serving the second UE on the second carrier frequency comprises: selecting the second carrier frequency based on the second carrier frequency being a lower frequency than the first carrier frequency, and causing the base station to transition from serving the second UE on the first carrier frequency to serving the second UE on the selected second carrier frequency.

18. The base station of claim 16, wherein determining that the number of first UEs served with TTI bundling on the first carrier frequency exceeds the threshold number comprises: accessing one or more records of the base station to determine how many of the base station's served UEs are enabled to engage in TTI bundled communication on the first carrier frequency, and based on how many of the base station's served UEs are enabled to engage in TTI bundled communication on the first carrier frequency, determining that the number of first UEs served with TTI bundling on the first carrier frequency exceeds the threshold number.

19. The base station of claim 16, wherein determining that the number of first UEs served with TTI bundling on the first carrier frequency exceeds the threshold number comprises: accessing one or more records of the base station to determine how many of the base station's served UEs are actively engaged in TTI bundled communication on the first carrier frequency, and based on how many of the base station's served UEs are actively engaged in TTI bundled communication on the first carrier frequency, determining that the number of first UEs served with TTI bundling on the first carrier frequency exceeds the threshold number.

20. The base station of claim 16, wherein each of the first UEs served with TTI bundling has a respective TTI bundling size defining a number of times a given transmission is repeated before an associated acknowledgement message is provided, and wherein the controller is further configured to dynamically define the threshold number based on the respective TTI bundling sizes of first UEs served with TTI bundling on the first carrier frequency.

* * * * *